UNITED STATES PATENT OFFICE.

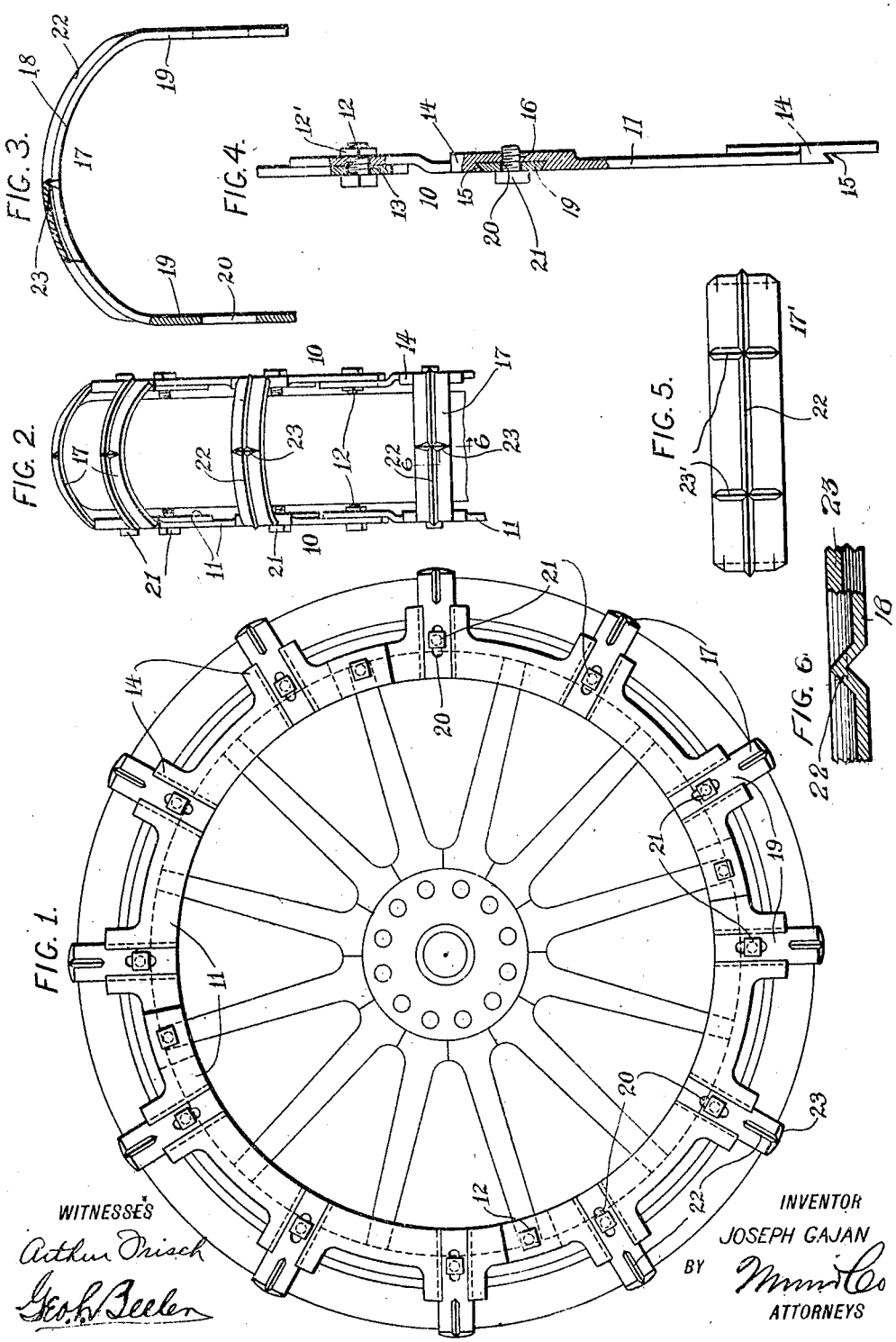

JOSEPH GAJAN, OF NEW YORK, N. Y.

NON-SKID ATTACHMENT FOR WHEELS.

1,308,705.     Specification of Letters Patent.     Patented July 1, 1919.

Application filed September 11, 1918. Serial No. 253,579.

*To all whom it may concern:*

Be it known that I, JOSEPH GAJAN, a citizen of the United States, and a resident of the city of New York, borough of Manhattan, in the county and State of New York, have invented a new and Improved Non-Skid Attachment for Wheels, of which the following is a full, clear, and exact description.

This invention relates to non-skid devices for road vehicle wheels, and has particular reference to attachments for single tread wheels such as are commonly used on automobiles, motorcycles, bicycles, or the like, having pneumatic tires.

Among the objects of the invention is to provide a non-skid attachment comprising an annular series of arc shaped plate sections adapted to be arranged in pairs on opposite sides of the tire or rim and having a plurality of spur members adjustably connected to each pair of plate sections, the entire structure being applicable to or removable from a wheel with a minimum amount of trouble or expenditure of time, and in practice being adapted to withstand the intense strains to which such devices are commonly subjected.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of a conventional pneumatic tired wheel equipped with my improvement.

Fig. 2 is a front elevation of a part of the same structure as indicated in Fig. 1.

Fig. 3 is an enlarged detail view of one of the spur members, one leg of which is shown in longitudinal section.

Fig. 4 is a fragmentary view of the plate sections indicating especially the form of the spur socket, and the manner of uniting adjacent sections.

Fig. 5 is a plan view of the tread portion of a modified form of spur, and

Fig. 6 is a cross sectional detail on the line 6—6 of Fig. 2 showing the longitudinal and transverse crimping of the spur structure.

Referring now more particularly to the drawings, I show in Fig. 1 a conventional type of wheel with my improvement applied thereto, the wheel, being conventional, being shown in light lines without shading to clearly distinguish what is old from what is new. The non-skid attachment comprises essentially two annular side members 10 each shown as comprising four arc shaped plates 11 all lying, generally speaking, in the same plane along the side of the tire or rim, each plate section 11 being articulated to the next section by means of a pivot member 12 indicated as in the form of a short bolt having a nut 12'. This pivot member passes through two smooth holes 13 in the meeting or overlapping ends of the plate sections. For the sake of neatness of appearance the inner edge of the plate sections or the edge nearest to the hub of the wheel approximates a true circle, while there extend outward radially from each plate section a series of lugs 14 each having a dovetailed socket 15 formed therein with parallel edges. This socket is indicated as being arranged on the outer face of the lug or remote from the tire. At any convenient place the wall of the lug is provided with an internally threaded hole 16. The lug portions of the plates are approximately twice as thick as the remaining portions of the plates, and one of the overlapping ends is preferably offset so as to make the joint through which the pivot fastener passes approximately as thick as the socket member. (See Fig. 4.)

The two side annular plate members 10 are preferably identical in structure, the several joints having pivots 12 being in transverse alinement, and with the sockets 15 of one member directly opposite those of the other member. 17 indicates one of the series of spur members shown preferably U-shaped and formed of any suitable rigid material such as heavy plate metal drop forged, or the like, and embodying a tread portion 18 outwardly convexed in form to approximate the form of the tread portion of the tire, and also including two flat parallel leg members 19 each having an opening 20 therethrough which is indicated as being preferably in the form of a radial slot. The side edges of each leg 19 are parallel and dovetailed to correspond to the cross section of the socket 15 in and along which such leg is adjustably fitted and locked by any suitable means such as a clamping screw 21 coöperating with the threaded hole 16 in the wall of the socket. The slots 20 provide for radial adjustment of the spurs inward or outward with respect to the center of the wheel so as to insure proper frictional engagement between the inner surfaces of the spurs and the tire. Consequently if the tire should be well worn it would be advisable to adjust the spurs inward prior to the application of the attachment to the wheel. For the purpose of manipulating the attachment it is advisable to loosen the pivots 12 and disconnect one pair of such pivots so as to extend the attachment in open form after which it may be readily applied to the wheel. The adjacent free end portions are grasped by any suitable form of tool or jack for the purpose of drawing them together to reattach the removed pivots. Ordinarily the spurs are not adjustable along the sockets 15 when the attachment is applied to the wheel, such adjustment of the spurs being necessary only at remote intervals, or as a result of a considerable amount of wear on the treads of the tires. The form of the spurs and the means for attaching them to the plate members assure a most rigid and reliable structure, one which is well adapted not only for non-skid purposes, but to withstand the terrific strains or stresses to which such devices are subjected in ordinary road practice.

The spurs being formed of plate or sheet metal may easily be so crimped as to provide suitable stiffening and gripping features such as ribs 22 and 23 extending respectively transversely and longitudinally of the tread of the wheel. The particular design or arrangement of these ribs may be varied, and as indicated in Fig. 5 I provide two of the ribs 23' on the tread or face portion of the spur member 17'.

I claim:

1. The herein described non-skid attachment for wheels comprising a series of arc shaped plate members adapted to be applied along one side of the wheel, pivot members articulating adjacent plate members together, the inner edges of which describe a circle, each plate member having a plurality of lugs projecting radially outward therefrom, and each lug having a radial socket, a series of non-skid spurs having leg members fitted in said sockets, means to lock the leg members therein, the spurs extending thence across and around the tread portion of the wheel, and means on the opposite side of the wheel to engage and hold the portions of the spurs remote from the sockets aforesaid.

2. In a non-skid attachment for wheels, the combination of a series of arc shaped plate members adapted for application along one side of the wheel, means to connect adjacent plate members together into an annular series, said plate members having radially disposed dovetailed sockets, a series of non-skid spurs having legs with parallel dovetailed edges fitted in their respective sockets, the spurs extending thence across the tread portion of the wheel, means to lock said legs in the sockets, and means on the opposite side of the wheel from said plates to support the remote portions of the spurs.

3. In a non-skid attachment for wheels, the combination of a circular series of articulated plates on one side of the wheel, said plates having radially disposed dovetailed sockets on the face remote from the wheel, each socket having a threaded hole through its wall, a series of non-skid spurs having flat straight legs radially adjustably fitted in said sockets, extending thence across the tread of the wheel, each leg having a radial slot registering with said hole, screw fasteners passing through the slots and into the holes to lock the legs in the sockets, and means connected to the remote portions of the spurs to stiffen and strengthen them.

4. In a non-skid attachment for wheels, the combination of two parallel annular series of side plates, means to articulate the plates of each series together, the articulations of the two series of plates being in transverse alinement, each series of plates being provided with radial sockets, an annular series of non-skid spurs substantially U-shaped each having a pair of straight legs coöperating with a pair of sockets of the respective series of plates, and means to lock said legs in the sockets with the tread portions of the spurs bearing against the tread portion of the wheel.

JOSEPH GAJAN.